United States Patent Office 2,871,700
Patented Feb. 3, 1959

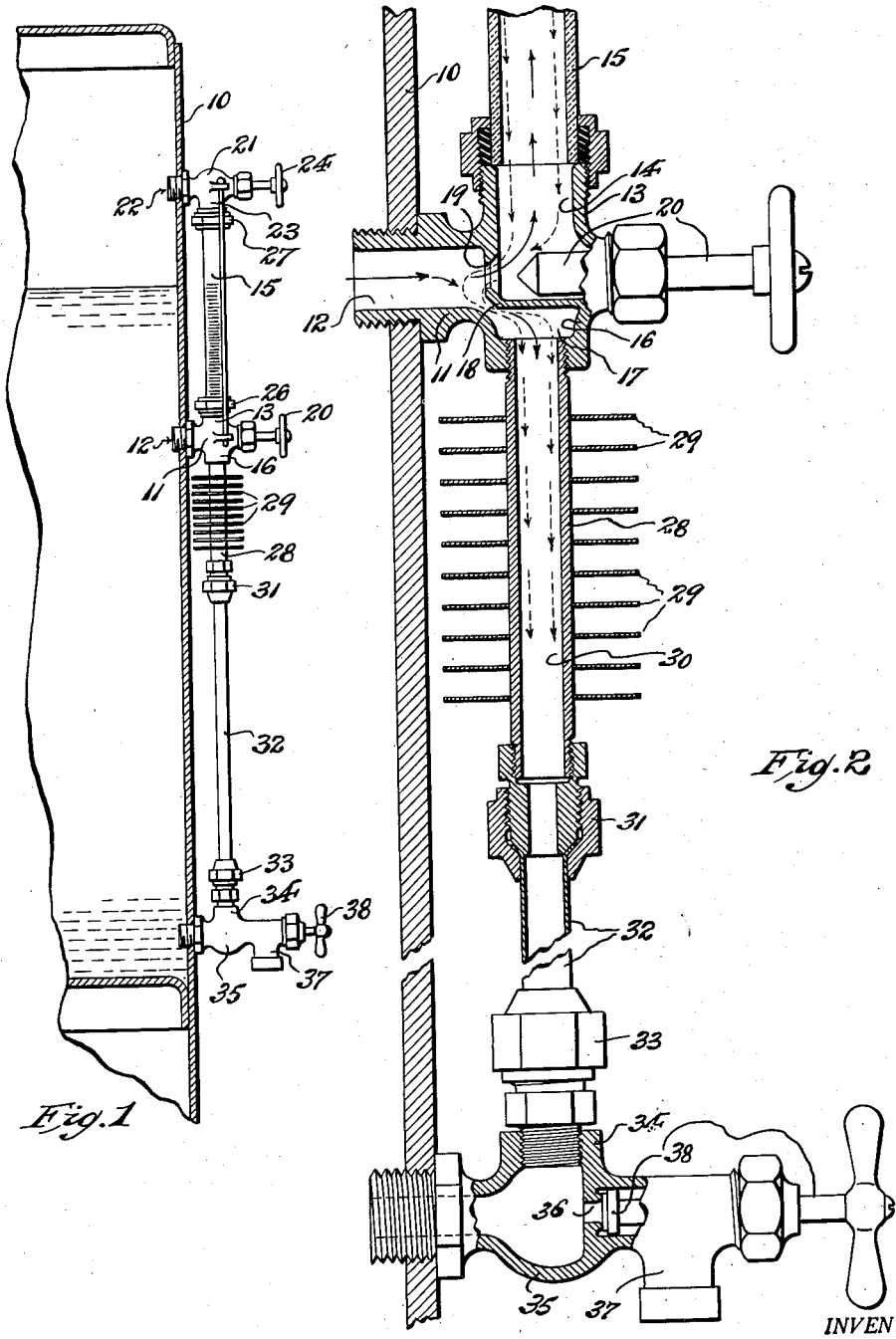

2,871,700

WATER LEVEL INDICATING GAGE FOR STEAM BOILERS

John A. Hilkene, Bloomfield, N. J.

Application April 5, 1955, Serial No. 499,274

1 Claim. (Cl. 73—328)

This invention relates to water level indicating gages for steam boilers; and the invention has reference, more particularly, to an improved gage, for such purpose, of the water glass or sight type.

A serious objection to steam boiler water level indicating gages of the water glass or sight type is the tendency of substances, dirt and other solids, which are suspended in the boiler water, to be precipitated from the water content of the gage glass so as to deposit a coating thereof on the internal surface of the gage glass. The resultant staining of the gage glass so obscures the same that sight of the water level therein is undesirably interfered with, and often entirely prevented. By reason of this, it becomes necessary to frequently dismantle the gage, and remove the gage glass for cleaning. The reason such precipitation of straining substance within the gage glass occurs is that the water, entered in the latter from the boiler, remains substantially static or non-flowing. The water content of the gage glass being substantially quiescent, such static condition thereof allows time for and thus promotes precipitation of the staining substances, and consequent undesirable deposit of said substances upon the internal surfaces of the gage glass.

Having the above in view, it is an object of this invention to provide a construction of water glass type gage, and such novel connected relation thereof to the steam boiler to be served thereby, that the content of water within the gage glass is caused to constantly flow or circulate therethrough, without however disturbing the level of said water content within the glass as determined by the level of water in the boiler by which the gage glass is supplied.

The invention has for another object to provide external conduit means connected with the boiler water intake end of the gage glass structure, whereby communication is established between the lower end of the gage glass and the relatively cool bottom portion of the water content of the boiler, said conduit means being exposed to the atmosphere so that the water in the gage glass and in said conduit means is subjected to a temperature drop as compared with the temperature of the water entering the gage glass from the relatively hot water content of the boiler, with the consequence that the relatively cool water tends to flow back to the bottom of the boiler through said conduit means. The resultant temperature differential between the entering hot water and the descending cool water causes movement of the water through the gages glass, without however disturbing the volume thereof within said gage glass as determined by the level of water in the boiler. Such movement of the water through the gage glass prevents a static condition thereof favorable to precipitation and deposit of staining substances suspended in the water, and consequently the gage glass remains clear and clean.

A further object of the invention is to include in connection with conduit means descending from the gage glass means to rapidly radiate heat, whereby to enhance the temperature drop of water descending through said conduit means.

The above and other objects of the present invention will be understood from a reading of the following detailed description of the invention in connection with the accompanying drawings showing an illustrative embodiment thereof, in which drawings:

Fig. 1 is a side elevational view of the gage glass structure as operatively mounted on a boiler to be served thereby, a fragmentary portion of said boiler being shown in longitudinal section.

Fig. 2 is a fragmentary longitudinal sectional view of portions of the gage glass structure drawn on an enlarged scale.

Referring to the drawings, in which like reference characters indicate corresponding parts, the reference character 10 indicates the steam boiler in connection with which is mounted a gage glass structure according to the present invention.

Communicating with the boiler interior, at a point suitably spaced below the normal level of the water content thereof, is a three-way bottom cock 11 having a water admission passage 12, an upper branch 13 providing a water outlet passage 14 for communication with the lower end of the tubular sight glass 15 of the gage structure, and a lower branch 16 providing a discharge passage 17 for communication with a water cooling return conduit means which leads back to the relatively cool bottom portion of the water content of the boiler as and for the purposes subsequently herein described. Said bottom cock 11 is internally subdivided by a partition 18 which separates the water admission passage 12, together with the lower water discharge passage 17, from the upper water outlet passage 14 which leads to the sight glass 15. This partition 18 is provided with a normally open port 19 which can be closed by a manipulatable valve 20, when it is desired to shut off supply of boiler water to the sight glass 15.

Communicating with the upper steam collection portion of the boiler interior, at a point suitably spaced above the normal level of the water content thereof, is a top cock 21 having a steam admission passage 22, and a lower branch 23 providing a passage for communication with the upper end of the tubular sight glass 15 of the gage structure. The steam admission passage 22, which is normally open, can be closed by a manipulatable valve 24, when it is desired to shut off communication of said top cock 21 with the boiler interior.

The lower end of the sight glass 15 is detachably connected to the bottom cock 11 by a suitably packed coupling union 26, which is threaded onto the upper branch 13 of said bottom cock. Similarly, the upper end of the sight glass 15 is detachably connected to the top cock 21 by a like packed coupling union 27 which is threaded onto the lower branch 23 of said top cock.

The water cooling return conduit means, which leads downward from the lower branch 16 of the bottom cock 11 back to the relatively cool bottom portion of the water content of the boiler, comprises a conduit structure which, being external to the boiler, is exposed to the atmosphere, and which is therefore adapted to radiate heat to said atmosphere, whereby to cause a drop in temperature of the boiler water contained therein. Said conduit structure, in simple form thereof, may comprise merely a thin wall metallic tubing which is interconnected between the bottom cock 11 and a suitable coupling fitting adapted to connect its lower end to the boiler interior which is occupied by the relatively cool portion of the water content of the boiler. Preferably, however, said conduit structure includes, at its upper receiving end adjacent to the bottom cock 11 which supplies to the gage sight glass, suitable radiator means operative to facilitate rapid dissipation of heat from the water contained in said conduit structure. A preferred form of the water cooling return conduit means, as shown, comprises a tubular radiator member 28 which is provided with externally projecting heat conductive fins 29 of suitable form. The upper end of this radiator member 28 is threaded into the lower branch 16 of the bottom cock 11, so that the discharge passage 17 of the latter communicates with the descending internal passage 30 of said radiator member. Connected with the lower end of said radiator member 28, by suitable coupling union means 31, is the upper end of a tubular conduit 32, which is preferably provided by a length of thin wall metallic tubing, such as copper tubing. The lower end of said tubular conduit 32 is connected, by suitable coupling union means 33, with the upper intake branch 34 of a coupler fitting 35 which is engaged with the boiler for communication with the lower portion of the water content thereof. Said coupling fitting 35 is provided at its outer side with an outlet port 36 which discharges to a drain cock section 37; said outlet port being normally closed by a manipulatable faucet valve 38.

To put the gage structure in boiler water level indicating service, the top cock 21 is opened by retraction of the valve 24, and the port 19 of the bottom cock 11 is opened by retraction of the valve 20. Under these conditions, hot water from the boiler enters the bottom cock 11 through the admission passage 12, so that part thereof flows through the open port 19 and branch passage 14 into the sight glass 15, whereby to fill the latter to a level corresponding to the level of the water content of the boiler. Another part of the thus supplied hot water flows through the branch passage 17 of the bottom cock 11 into the radiator member 28 and conduit 32, whereby to fill the water cooling return conduit means including these parts, and thence back to the boiler.

The heat from the hot water which fills the radiator member 28 is rapidly conducted through the walls of said radiator member and through its external fins 29 to the atmosphere, and heat from the water in the tubular conduit 32 is also dissipated through the thin walls thereof. Such dissipation of heat causes a substantial drop in temperature of the water in the return conduit means, whereby the water becomes relatively cold and of greater specific gravity than that of the initial hot water entering the admission passage 12 of the bottom cock. As a result of this the cold water tends to sink or flow down through the return conduit means back to the relatively cool water in the lower portion of the boiler. At the same time, the water contiguous to the walls of the sight glass 15 also tends to drop in temperature by radiation of its heat through said sight glass walls. The cooled water in the sight glass tends to sink in countercurrent flow relative to hot water entering through the admission passage 12 of the bottom cock 11. For example, assuming the temperature of hot water entering through the admission passage 12 of the bottom cock 11 approximates a temperature of 200° F., the water in the sight glass 15 contiguous to the walls thereof, by radiation of heat through said walls, undergoes a temperature drop to approximately 180° F., and likewise the water descending the radiator member 28 and conduit 32 undergoes a temperature drop to 180° F. or less. It will thus be understood that there is a temperature differential between the cool water in the sight glass 15 and the hot water in the admission passage 12 of the bottom cock 11, with the consequence that there is no impact pressure at the port opening 19 of the bottom cock which would prevent downflow of cool water from the sight glass through the relatively hot water in the admission passage 12 of the bottom cock, and thence to join the relatively rapidly cooling and faster moving cooling water which descends the return conduit means. By reason of this, relatively cool water displaced from the sight glass 15 is slowly replaced by ingoing hot water, so that the level indicating volume of water in said sight glass, as determined by the level of water in the boiler, remains constant. It will now be understood that since a relatively slow countercurrent movement of water in the sight glass occurs, the water in said sight glass does not remain static or quiescent, and therefore suspensions of glass staining substances and solids contained therein are not permitted time to precipitate and deposit upon the internal surfaces of the sight glass, so that the latter remains clean and clear. In Fig. 2, the direction of current movement of hot water is indicated by solid line arrows, and of relatively cold water by broken line arrows.

If for any reason it seems desirable to remove the sight glass 15 from the gage structure, e. g., for replacement if broken, communication between the same and the boiler interior can be interrupted by closing the valves 20 and 24 of the bottom and top clocks 11 and 21, whereupon the unions 26 and 27 can be detached from said cocks so as to free the sight glass. The novel structure of the bottom cock 11 is such that although its valve 20, when closed, shuts off communication between the boiler and the sight glass 15, it does not interrupt circulation of water from an upper level of the boiler through the radiator member 28, and conduit 32 back to a lower level of the boiler.

If it is desired to drain the sight glass 15, the drain cock 37 can be opened, so that water in the boiler can be drawn down to a level below the bottom end of said sight glass.

Having now described my invention, I claim:

A boiler water level indicating gage structure adapted to be externally mounted relative to the boiler comprising a three-way cock communicating with the boiler interior at a point spaced below the normal level of water therein, said bottom cock having an intake branch leading from the boiler, an upper branch and a lower branch, a top cock communicating with the boiler interior above the normal level of water therein, a sight glass connected in communication between said top cock and the upper branch of the bottom cock, a water cooling return conduit means providing a continuous uninterrupted water passage, said conduit means comprising an externally finned radiator member connected to the lower branch of said bottom cock and a thin walled tubular conduit of high thermal conduction material extending downwardly from said tubular conduit, and means to connect said tubular conduit in communication with the boiler interior which is occupied by the relatively cool portion of the boiler water, the bottom cock having a chamber formed therein, said chamber being subdivided by a partition intermediate the upper branch of the cock and the intake and lower branches of the cock, said partition having a normally open port to provide communication between the intake and lower branches of the cock and the upper branch of the cock, and said bottom cock having manipulatable valve means for closing said port at will.

References Cited in the file of this patent

UNITED STATES PATENTS

| 226,418 | Purves | Apr. 13, 1880 |
| 1,333,839 | Daniels | Mar. 16, 1920 |
| 1,869,400 | Underwood | Aug. 2, 1932 |

FOREIGN PATENTS

| 389,885 | Germany | Feb. 9, 1924 |